US008626936B2

(12) United States Patent
Arendt et al.

(10) Patent No.: US 8,626,936 B2
(45) Date of Patent: Jan. 7, 2014

(54) PROTOCOL INDEPENDENT SERVER REPLACEMENT AND REPLICATION IN A STORAGE AREA NETWORK

(75) Inventors: James Wendell Arendt, Austin, TX (US); Katherine Barabash, Haifa (IL); Irit Loy, Bet Hanania (IL)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 12/018,213

(22) Filed: Jan. 23, 2008

(65) Prior Publication Data

US 2009/0187668 A1    Jul. 23, 2009

(51) Int. Cl.
*G06F 15/16* (2006.01)

(52) U.S. Cl.
USPC .......................................... 709/230; 709/223

(58) Field of Classification Search
USPC ........................... 709/220, 221, 224, 230, 223
See application file for complete search history.

(56) References Cited

U.S. PATENT DOCUMENTS

| | | | |
|---|---|---|---|
| 5,689,706 A * | 11/1997 | Rao et al. ............................. 1/1 |
| 5,893,140 A * | 4/1999 | Vahalia et al. ................. 711/118 |
| 6,266,335 B1 * | 7/2001 | Bhaskaran ..................... 370/399 |
| 6,611,503 B1 * | 8/2003 | Fitzgerald et al. ............. 370/260 |
| 6,631,417 B1 * | 10/2003 | Balabine ........................ 709/229 |
| 6,839,746 B1 * | 1/2005 | Muthiyan et al. .............. 709/220 |
| 6,871,284 B2 * | 3/2005 | Cooper et al. ..................... 726/1 |
| 6,947,981 B2 | 9/2005 | Lubbers et al. |
| 7,120,654 B2 | 10/2006 | Bromley |
| 7,222,172 B2 * | 5/2007 | Arakawa et al. ............... 709/224 |
| 7,346,664 B2 * | 3/2008 | Wong et al. .................... 709/214 |
| 7,349,340 B2 * | 3/2008 | Sahai et al. .................... 370/235 |
| 7,428,214 B2 * | 9/2008 | Nosella .......................... 370/228 |
| 7,602,774 B1 * | 10/2009 | Sundaresan et al. .......... 370/381 |
| 7,743,138 B2 * | 6/2010 | Gallant et al. ................. 709/224 |
| 7,752,294 B2 * | 7/2010 | Meyer et al. ................... 709/223 |
| 7,769,722 B1 * | 8/2010 | Bergant et al. ................. 707/681 |
| 7,827,317 B2 * | 11/2010 | Baldwin et al. ............... 709/249 |
| 8,220,041 B2 * | 7/2012 | Boyce .............................. 726/13 |
| 2003/0172149 A1 | 9/2003 | Edsall et al. |
| 2004/0148376 A1 | 7/2004 | Rangan et al. |
| 2005/0024634 A1 | 2/2005 | Barker et al. |
| 2005/0044162 A1 | 2/2005 | Liang et al. |
| 2005/0159927 A1 * | 7/2005 | Cruz et al. ..................... 702/188 |
| 2005/0246345 A1 | 11/2005 | Lent et al. |
| 2006/0253549 A1 * | 11/2006 | Arakawa et al. ............... 709/217 |

(Continued)

OTHER PUBLICATIONS

Sourcetek Systems, Inc. "NAS or iSCSI: Selecting a Storage Systems", http://www.sourceteksystems.com/NAS_iSCSI.htm.

(Continued)

*Primary Examiner* — Sargon Nano
(74) *Attorney, Agent, or Firm* — F. Jason Far-hadian, Esq.; Century IP Group

(57) ABSTRACT

A method for adding a server to a storage area network, the method comprising identifying a set comprising one or more communication protocols for connecting a second server to a first storage device configured to communicate with a first server using a first protocol, wherein the set of protocols comprises protocols that are supported by both the second server and the first storage device; selecting a second protocol from the set of protocols; and configuring the first storage device, the second server, and associated connection devices, wherein the second server may communicate with the first storage device using the second protocol.

25 Claims, 3 Drawing Sheets

(56) References Cited

U.S. PATENT DOCUMENTS

| | | | |
|---|---|---|---|
| 2007/0143373 A1* | 6/2007 | D'Souza et al. | 707/204 |
| 2007/0143374 A1* | 6/2007 | D'Souza et al. | 707/204 |
| 2007/0150526 A1* | 6/2007 | D'Souza et al. | 707/203 |
| 2007/0168495 A1* | 7/2007 | Rothstein et al. | 709/224 |
| 2007/0168500 A1* | 7/2007 | D'Souza et al. | 709/224 |
| 2007/0174691 A1* | 7/2007 | D'Souza et al. | 714/13 |
| 2008/0115144 A1* | 5/2008 | Tsao | 718/105 |
| 2008/0168221 A1* | 7/2008 | Ballew et al. | 711/113 |
| 2008/0307021 A1* | 12/2008 | Okada et al. | 707/204 |
| 2009/0063696 A1* | 3/2009 | Wang et al. | 709/232 |
| 2009/0073884 A1* | 3/2009 | Kodama et al. | 370/235 |
| 2009/0248830 A1* | 10/2009 | Kodama et al. | 709/212 |
| 2010/0138395 A1* | 6/2010 | D'Souza et al. | 707/668 |
| 2011/0087792 A2* | 4/2011 | Wayda et al. | 709/230 |
| 2012/0266214 A1* | 10/2012 | Hagiu et al. | 726/3 |

OTHER PUBLICATIONS

Wikipedia, "Storage area network", http://en.wikipedia.org/wiki/Storage_area_network.

* cited by examiner

PROTOCOL INDEPENDENT SERVER REPLACEMENT AND REPLICATION IN A STORAGE AREA NETWORK

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to storage area networks and, more particularly, to systems and methods for protocol independent server replacement and replication in a storage area network.

BACKGROUND

In a typical storage area network (SAN), several servers are remotely connected to one or more storage devices. The servers treat the devices as if the devices are locally attached and may boot from or store data in the storage devices.

The benefits of SAN technology include flexible data storage, centralized storage management, disaster recovery, and large scalability. A server may connect to a SAN using different types of connections and protocols. Existing software implementations, however, prevent the user from taking full advantage of the benefits of SAN technology by imposing restrictions on the type of servers that may be connected to a SAN in some important SAN management scenarios.

For example, adding a new server to a SAN (for replacement or as a backup) requires the new server to connect to the SAN using the same SAN connectivity protocol or communication standard (e.g., FC—Fiber Channel, iSCSI—Small Computer System Interface over the Ethernet, SAS—Serial Attached Small Computer System Interface) as an existing server.

Systems and methods are needed that can overcome the aforementioned shortcomings by providing multi-protocol compatibility when adding a new server to a SAN.

SUMMARY

The present disclosure is directed to a system and corresponding methods for protocol independent server replacement and replication in a storage area network.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for adding a server to a storage area network is provided. The method comprises identifying a set comprising one or more communication protocols for connecting a second server to a first storage device configured to communicate with a first server using a first protocol, wherein the set of protocols comprises protocols that are supported by both the second server and the first storage device; selecting a second protocol from the set of protocols; and configuring the first storage device, the second server, and associated connection devices, wherein the second server may communicate with the first storage device using the second protocol. The second server may replace or replicate the first server, and the selecting may be performed according to a prioritization algorithm that selects the second protocol from the set of protocols based on factors such as physical distance, cost, or connection speed.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods for protocol independent server replacement and replication in a storage area network.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
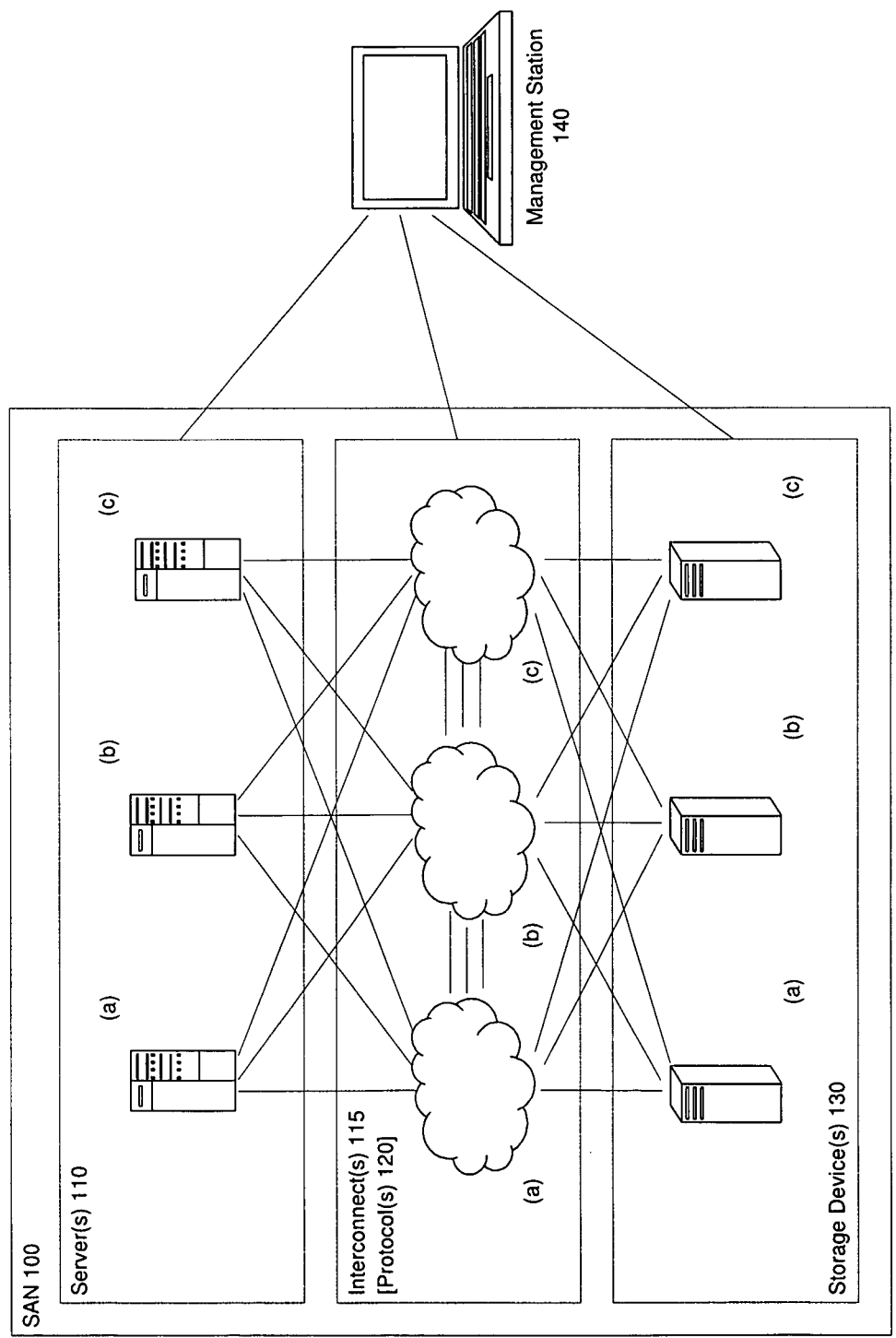
FIG. 1 illustrates an exemplary storage area network for protocol independent server replacement and replication, in accordance with one embodiment.

Referring to FIG. 1, in accordance with one embodiment, an exemplary storage area network (SAN) 100 may comprise server(s) 110, interconnects 115, storage device(s) 130, and management station 140. Server(s) 110 and storage device(s) 130 may be physically or logically connected by way of wired or wireless interconnect(s) 115, which may comprise physical media and connection devices. Protocol(s) 120 in conjunction with interconnects 115 govern and enable communication between the devices in the communication network.

In one embodiment, server(s) 110 and storage device(s) 130 may thus communicate in accordance with communication standards defined in protocol(s) 120. Management station 140 may logically configure server(s) 110, storage device(s) 130, and associated connection devices in interconnect(s) 115 so that server(s) 110 may communicate with storage device(s) 130 over protocols 120.

Each storage device 130 has communication ports that may receive or transmit data according to protocol(s) 120. Protocol(s) 120 may comprise, without limitation, protocols such as Fiber Channel (FC), Small Computer System Interface over the Ethernet (iSCSI), and Serial Attached Small Computer System Interface (SAS), for example. An FC protocol may require optic fiber wires, while an iSCSI protocol may require Ethernet cables, for example. As such, data communication over different protocols may require different system configurations that comply with the physical and logical properties of the communication components involved.

Management station 140 monitors and controls the operation of SAN 100's components (e.g., configuration of server(s) 110 for access to storage device(s) 130). SAN 100 may be reconfigured when a server 110*a* is added. Server 110*a* may be added to replace an existing server 110*b* due to hardware failure or to replicate existing server 110*b* for backup purposes or for cluster configurations (e.g., when several computing systems are treated as a single computing system).

Figure 2:
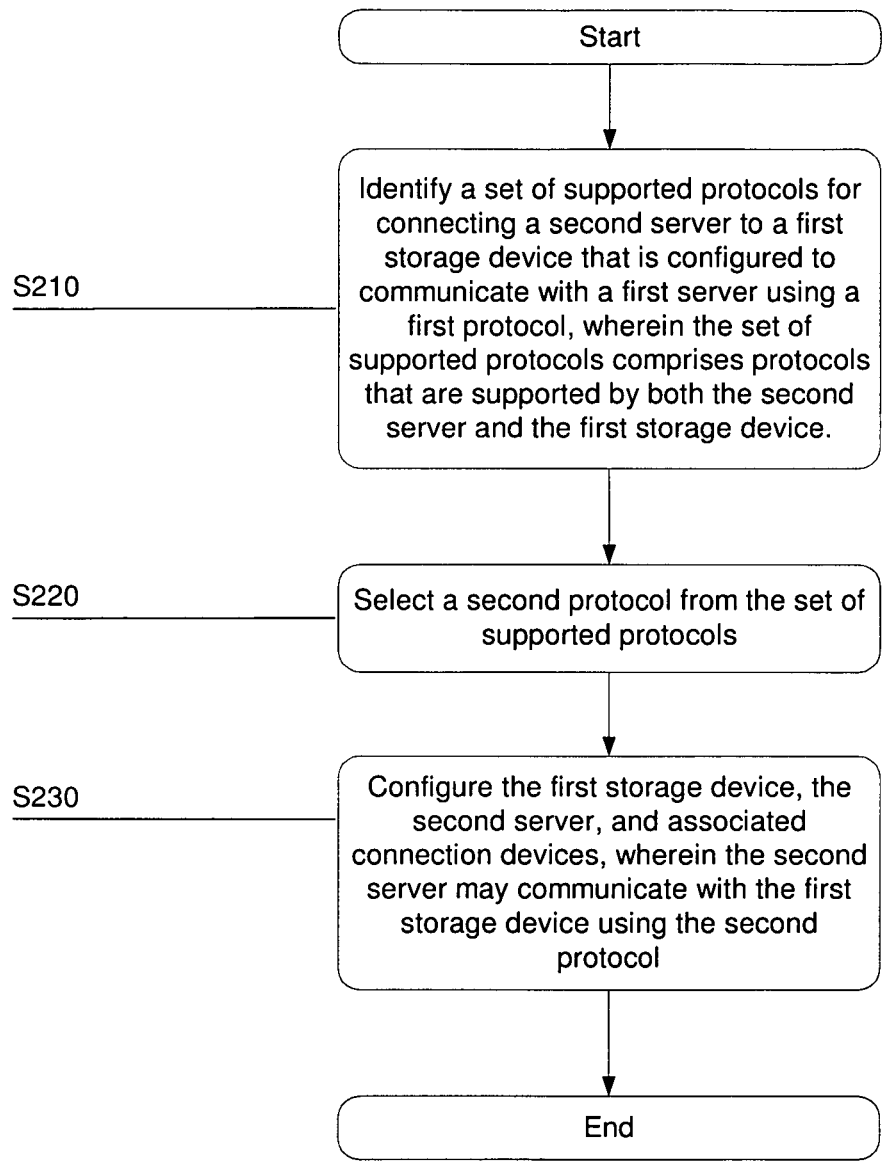
FIG. 2 is a flow diagram of a method for adding a server to a storage area network, in accordance with one embodiment.

Referring to FIG. 2, in accordance with one embodiment, server 110*a* may be added to replace or replicate existing server 110*b* by identifying a set of supported protocols 120 for connecting server 110*a* to a storage device 130*a* that is configured to communicate with existing server 110*b* (S210). A protocol 120*a* is selected from the set of supported protocols 120 (S220) and used to configure storage device 130*a*, server 110*a*, and associated connection devices in interconnect 115 so that server 110*a* may communicate with storage device 130*a* (S230).

Operations performed in blocks S210, S220, and S230 may be repeated for each storage device 130 that is configured as a storage resource for the existing server 110*b* so that server 110*a* may communicate with the same storage devices 130 as existing server 110*b*. It is noteworthy that management station 140 may compute and store the information necessary to perform the operation in block S230 until management station 140 has confirmed that the operation may be successfully performed for each storage device 130.

The set of supported protocols 120 may be identified by making a first list of protocols supported by server 110*a* and a second list of protocols supported by storage device 130*a* and computing the intersection between the two lists. For example, if server 110*a* supports protocols A, C, and D and storage device 130*a* supports protocols B, C, and D, then the set of supported protocols 120 includes protocols C and D.

In some cases, however, the set of supported protocols 120 may be empty, if there is no intersection between the first list of protocols supported by server 110*a* and the second list of protocols supported by storage device 130*a*. Such a scenario may arise, for example, if server 110*a* supports protocols A, B, and C and storage device 130*a* supports protocols D, E, and F.

In certain embodiments, the problem of an empty set of supported protocols 120 may be solved by transferring data between storage devices. For example, where server 110*a* supports protocols A, B, and C and storage device 130*a* supports protocols D, E, and F, no common protocol are shared between storage device 130*a* and server 110*a*. However, if a storage device 130*b* that supports protocols B, C, and D is present in SAN 100, then data from storage device 130*a* may be transferred to storage device 130*b*. In this manner, the set of supported protocols 120 may be calculated based on the common protocols shared between storage device 130*b* and server 110*a* (i.e., the set of supported protocols 120 will included protocols B and C, for example).

The set of supported protocols 120 may include a large number of protocols, especially if server 110*a* and storage device 130*a* support several of the same protocols. Thus, when several protocols are identified in the supported set 120, a protocol 120*a* may be selected from the supported set 120 by applying a prioritization algorithm.

For example, depending on implementation, the protocol used by existing server 110*b* may be chosen over other protocols for the purpose of maintaining consistency and efficiency. The prioritization algorithm may also take into account other factors such as physical distance, cost, connection speed, and other factors that may be important to maximizing overall system efficiency and integrity.

Figure 3:
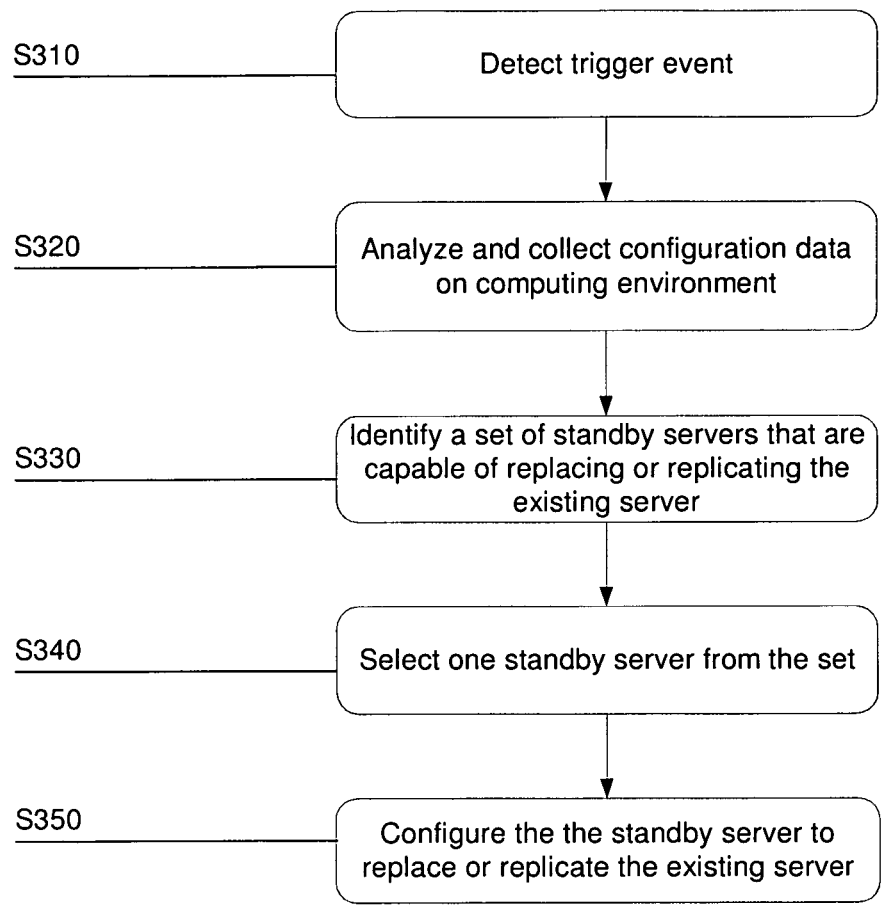
FIG. 3 is a flow diagram for replacing a server in a storage area network, in accordance with one embodiment.

In one embodiment, SAN 100 may comprise one or more standby servers (not shown) that are connected but have no configured storage devices. Referring to FIG. 3, in accordance with one implementation, management station 140 may add a standby server to replace or replicate existing server 110*b* in response to detecting a trigger event (S310). After analyzing and collecting configuration data from the computing environment (S320), management station 140 may select a standby server from the set of standby servers that are capable of replacing or replicating existing server 110*b* (S330-S340). Management station 140 then configures the selected standby server to replace or replicate existing server 110*b* (S350).

The trigger event may cause management station 140 to either replace or replicate existing server 110*b*. Existing server 110*b* may be replaced with a standby server for maintenance or repairs or due to hardware failure, for example. Existing server 110*b* may be replicated by a standby server as a response to server overload or lack of resources, for example. The trigger event is not limited to hardware failure. Trigger events may also include, without limitation other events that may render existing server 110*b* inoperable or inefficient.

In one embodiment, management station 140 may analyze and collect configuration data from the computing environment by examining the configuration of each network device in the computing environment. Depending on implementation, management station 140 may update a database whenever a change is made to SAN 100. The configuration data may comprise information about the particular storage devices 130 configured to communicate with a particular server 110, the protocols 120 supported by the configured storage devices 130, and the protocols 120 used by a particular server 110.

The collected configuration data may be used to identify a set of standby servers that are capable of replacing existing server 110*b*. A standby server is capable of replacing existing server 110*b* if the standby server is connected to existing server 110*b*'s storage devices 130 and it is possible to configure storage devices 130, the standby server, and interconnect 115 devices to provide connectivity between the server and the storage.

It is noteworthy that a standby server may be identified more than once in the set of standby servers, if there is more than one way or path for the standby server to connect to the existing server 110*b*'s storage devices 130. For example, if the standby server supports protocols A, B, and C, and a storage device 130a supports protocols A, B, C, and D, the set of supported protocols 120 comprise protocols A, B, and C. In this case, there are at least three ways that storage device 130a may connect to the standby server (i.e., through each one of the three protocols A, B, and C). Thus, the standby server may be identified at least three times.

The standby server may also connect to storage device 130a using other protocols. As provided earlier, in certain embodiments, the set of supported protocols 120 may be expanded to include protocols that are supported by another storage device 130b. The possibility to connect through multiple protocols advantageously reduces the number of standby servers that may be needed in SAN 100 for backup purposes because a standby server is not needed for each existing server 110 that connects using a different protocol.

Also provided earlier, selecting a standby server may be done in accordance with a prioritization algorithm. Once the standby server is selected, SAN 100 may be reconfigured so that the standby server may have access to the same data that server 110b had access to prior to being replaced.

Depending on implementation, it is possible that the present invention can take the form of an entirely hardware embodiment, an entirely software embodiment or an embodiment containing both hardware and software elements. A software embodiment may include, but not be limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for replacing or replicating a first server, in communication with a first storage device, with a second server, the method comprising:
   identifying a set of protocols comprising one or more communication protocols that are supported by both: (1) the first storage device connected to the first server and (2) the second server, not connected to the first storage device,
   wherein a protocol that is supported by both the first storage device and the second server provides the means for the second server to read and write data to the first storage device;
   selecting a protocol from the set of protocols;
   configuring the first storage device, the second server, and associated connection devices, so that the second server establishes a connection and communicates with the first storage device to read and write data to the first storage device using the selected protocol, such that data stored on the first storage device is accessible to the second server in a storage area network; and
   disconnecting the first storage device from the first server, once the second server directly communicates with the first storage device to read and write data from the first storage device using the selected protocol.

2. The method of claim 1, wherein the second server replaces the first server.

3. The method of claim 1, wherein the second server replicates the first server so that the first storage device remains connected to the first server.

4. The method of claim 1, wherein the selecting is performed according to a prioritization algorithm that selects the selected protocol from the set of protocols based on at least one of physical distance, cost, and connection speed.

5. The method of claim 1, further comprising maintaining a database that includes configuration information about one or more of the first server, the first protocol, the first storage device, the second server, the selected protocol or other protocols supported by other servers or storage devices in the network.

6. The method of claim 5, wherein the database also includes configuration information about the second storage device.

7. The method of claim 5, wherein the configuration information stored in the database may be used to identify a set of standby servers that are capable of replacing or replicating the first server.

8. The method of claim 1, further comprising transferring data from the first storage device to the second storage device, in response to determining that there are no protocols that are supported by both the first storage device and the second server.

9. A system for replacing or replicating a first server, in communication with a first storage device, with a second server, the system comprising:
   a processor for identifying a set of protocols comprising one or more communication protocols that are supported by both: (1) the first storage device connected to the first server and (2) the second server, not connected to the first storage device, wherein a protocol that is supported by both the first storage device and the second server provides the means for the second server to read and write data to the first storage device;

wherein the first storage device is disconnected from the first server, once the second server directly communicates with the first storage device to read and write data from the first storage device using the selected protocol.

wherein a protocol is selected from the set of protocols; and wherein the first storage device, the second server, and associated connection devices, are configured so that the second server establishes a connection and communicates with the first storage device to read and write data to the first storage device using the selected protocol, such that data stored on the first storage device is accessible to the second server in a storage area network; and wherein the first storage device is disconnected from the first server, once the second server directly communicates with the first storage device to read and write data from the first storage device using the selected protocol.

10. The system of claim 9, wherein the second server replaces the first server.

11. The system of claim 9, wherein the second server replicates the first server so that the first storage device remains connected to the first server.

12. The system of claim 9, wherein the selecting is performed according to a prioritization algorithm that selects the selected protocol from the set of protocols based on factors such as physical distance, cost, or connection speed.

13. The method of claim 9, further comprising a logic unit for maintaining a database that includes configuration information about one or more of the first server, the first protocol, the first storage device, the second server, and the selected protocol or other protocols supported by other servers or storage devices in the network.

14. The system of claim 9, further comprising a logic unit for transferring data from the first storage device to the second storage device, in response to determining that there are no protocols that are supported by both the first storage device and the second server.

15. A computer program product comprising a non-transient computer readable storage medium having a computer readable program stored thereon, wherein the computer readable program when executed on a computer causes the computer to:

replace or replicate a first server, in communication with a first storage device, with a second server by:

identifying a set of protocols comprising one or more communication protocols that are supported by both: (1) the first storage device connected to the first server and (2) the second server, not connected to the first storage device, wherein a protocol that is supported by both the first storage device and the second server provides the means for the second server to read and write data to the first storage device:

selecting a protocol from the set of protocols;

configuring the first storage device, the second server, and associated connection devices, so that the second server establishes a connection and communicates with the first storage device to read and write data to the first storage device using the selected protocol, such that data stored on the first storage device is accessible to the second server in a storage area network; and disconnecting the first storage device from the first server, once the second server directly communicates with the first storage device to read and write data from the first storage device using the selected protocol.

16. The computer program product of claim 15, wherein the second server replaces the first server.

17. The computer program product of claim 15, wherein the second server replicates the first server so that the first storage device remains connected to the first server.

18. The computer program product of claim 15, wherein the selecting is performed according to a prioritization algorithm that selects the selected protocol from the set of protocols based on factors such as physical distance, cost, or connection speed.

19. The computer program product of claim 15 that further causes the computer to maintain a database that includes configuration information about one or more of the first server, the first protocol, the first storage device, the second server, and the selected protocol or other protocols supported by other servers or storage devices in the network.

20. The computer program product of claim 15 that further causes the computer to transfer data from the first storage device to the second storage device, in response to determining that there are no protocols that are supported by both the first storage device and the second server.

21. The method of claim 1, wherein the first protocol is same as the selected protocol.

22. The system of claim 9, wherein the first protocol is same as the selected protocol.

23. The computer program product of claim 15, wherein the first protocol is same as the selected protocol.

24. The method of claim 21, wherein the second server is selected from a set of standby servers that are capable of replacing or replicating the first server according to at least one of distance, connection speed and cost.

25. The system of claim 22, wherein the second server is selected from a set of standby servers that are capable of replacing or replicating the first server according to at least one of distance, connection speed and cost.

* * * * *